Aug. 19, 1958  A. H. SHARPE ET AL  2,848,090
TYPEWRITER CONTROL MEANS
Filed Oct. 11, 1955  3 Sheets-Sheet 1
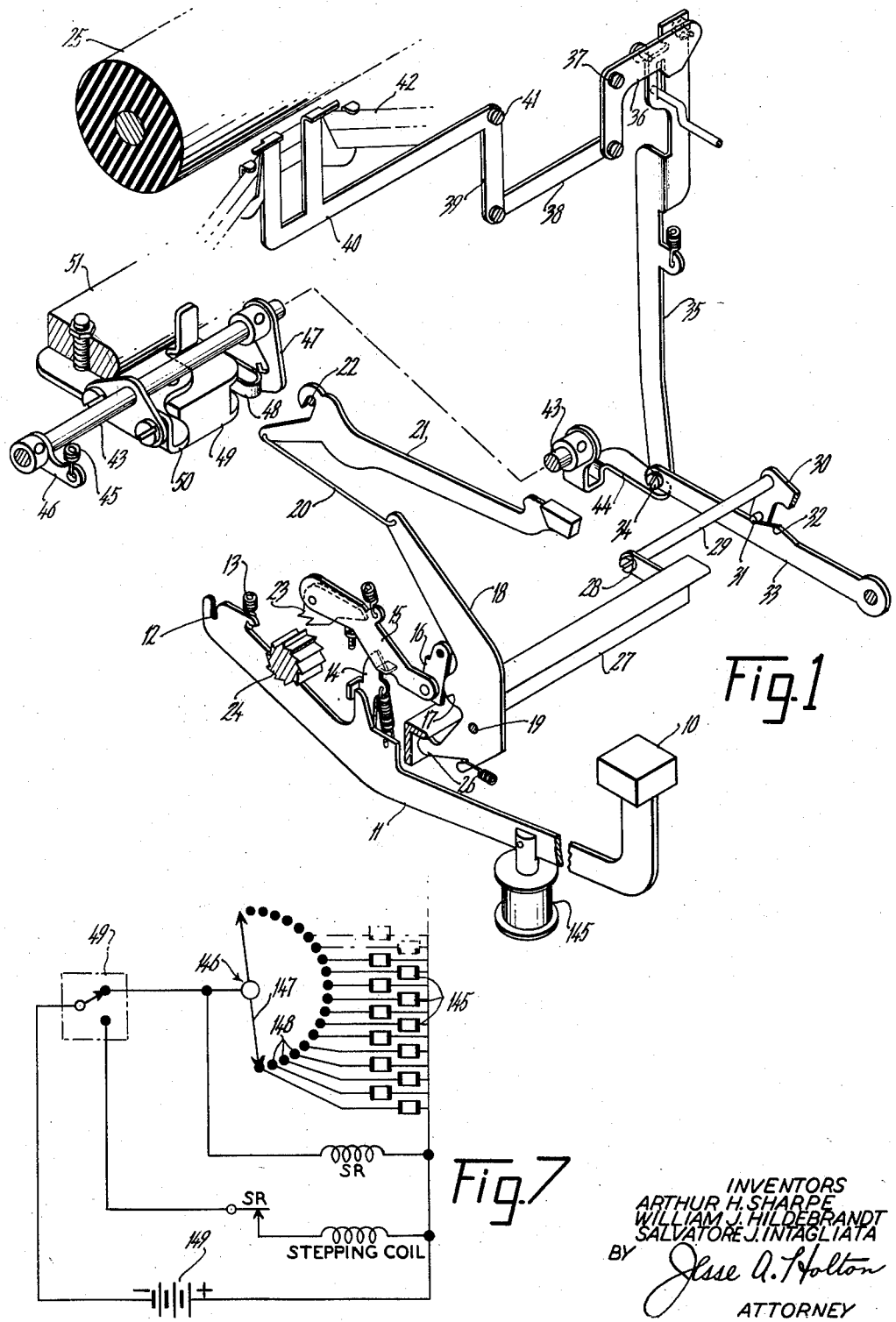
INVENTORS
ARTHUR H. SHARPE
WILLIAM J. HILDEBRANDT
SALVATORE J. INTAGLIATA
BY Jesse A. Holton
ATTORNEY

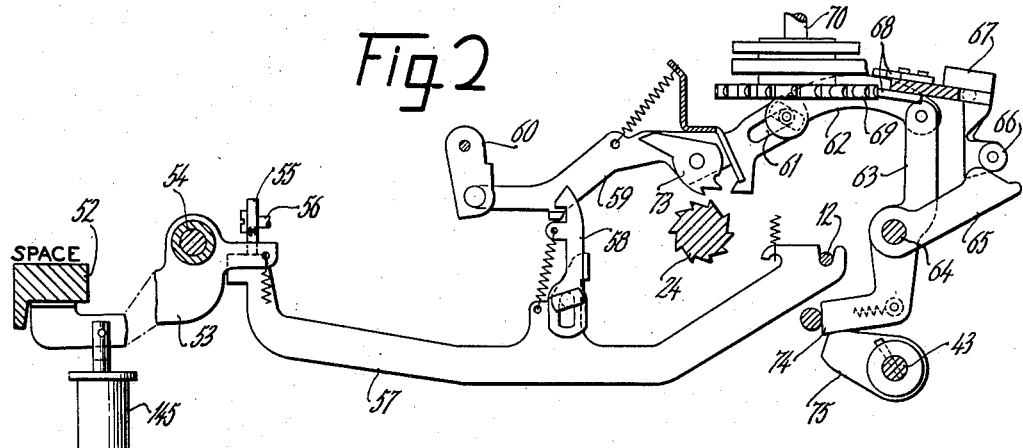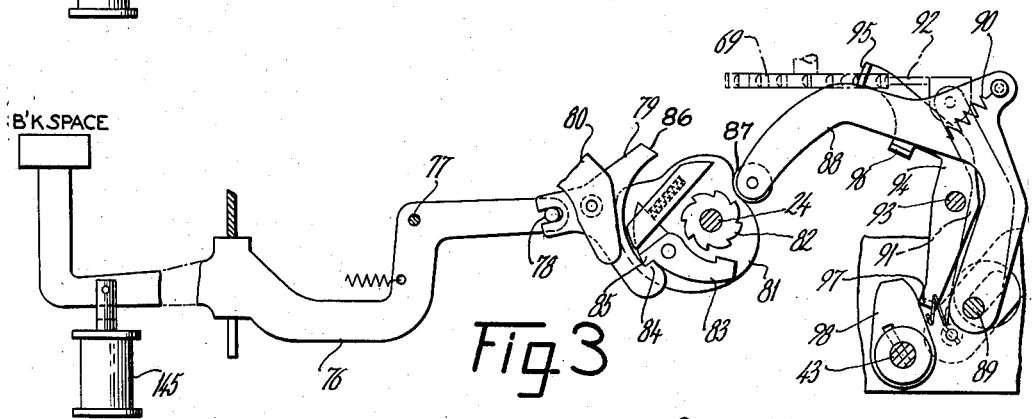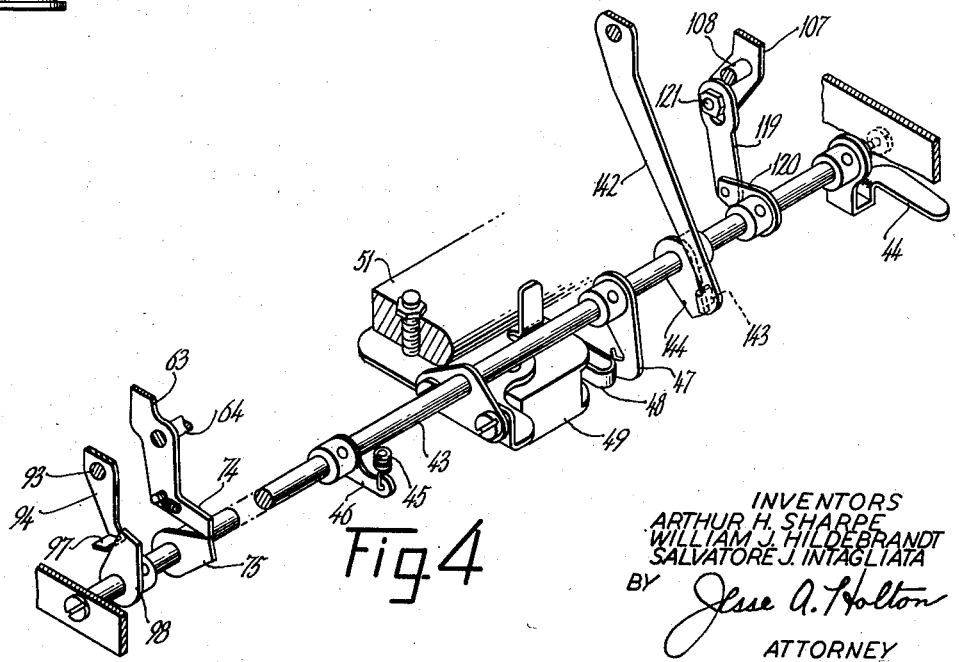

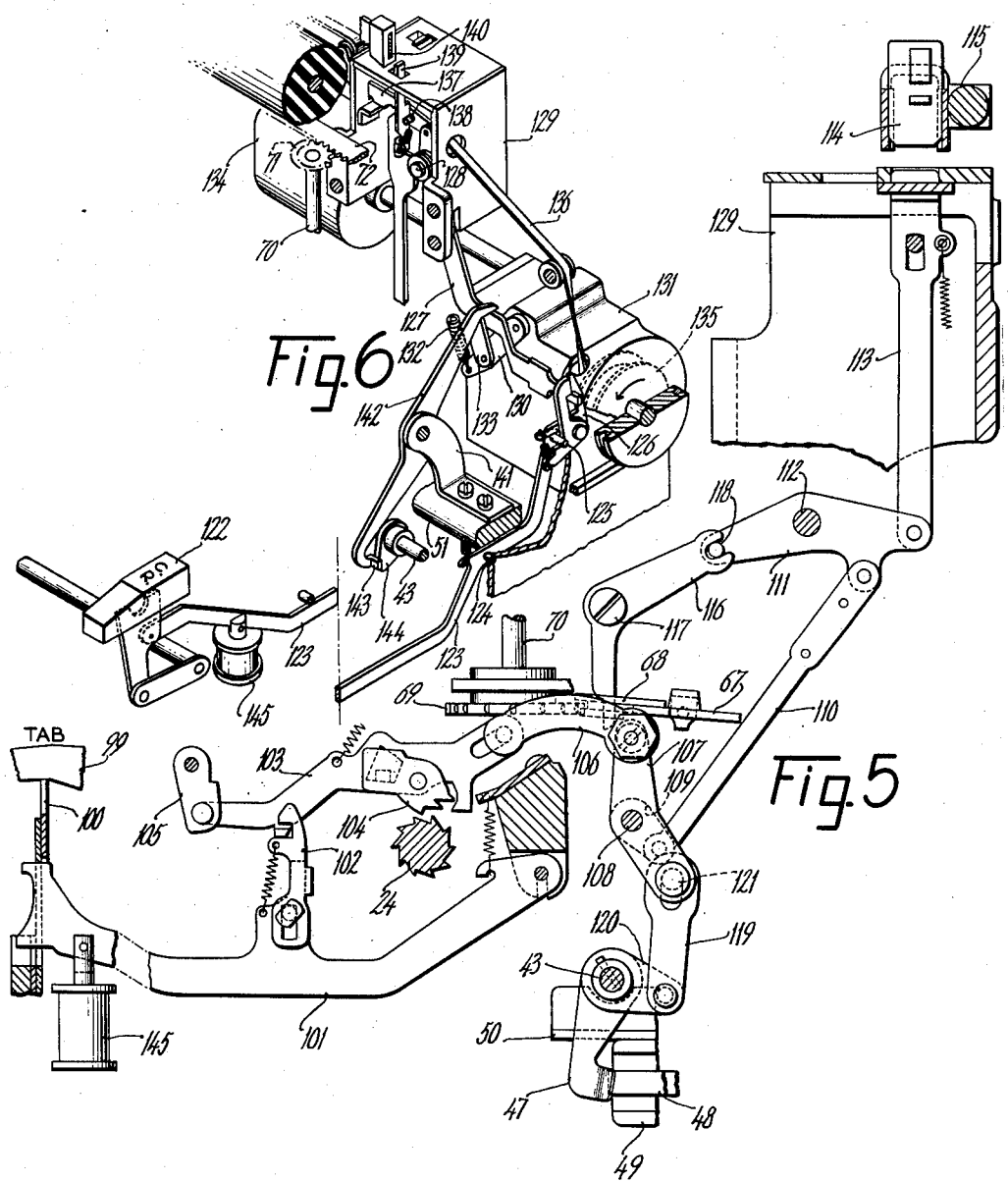

United States Patent Office 2,848,090
Patented Aug. 19, 1958

2,848,090

TYPEWRITER CONTROL MEANS

Arthur H. Sharpe, West Hartford, William J. Hildebrandt, Farmington, and Salvatore J. Intagliata, Hartford, Conn., assignors to Underwood Corporation, New York, N. Y., a corporation of Delaware Application October 11, 1955, Serial No. 539,724

8 Claims. (Cl. 197—19)

The present invention relates to automatically controlled typewriters and more particularly to a typewriter adapted to be operated entirely or in part under the control of a prearranged programming means such, for example, as a stepping switch, punched tape or card.

In so-called electric or power driven typewriters, the various functions of the machine such as typing, back spacing, carriage return, etc., while instituted selectively by the operation of keys, are carried out by the power of an electric motor acting through one or more continuously driven members. Such typwriters are now employed in various systems and for various purposes requiring operation of the machine by means other than a human operator. When these machines are so employed it is the usual practice to provide solenoids for operating the keys, the solenoids being energized under control of an outside agency such as a computer, a punched tape or the like. The computer, tape, card or the like does not usually control the typewriter directly but contains information which is sensed or read by some other means and the other means, hereinafter referred to as a "reader," controls the typewriter solenoids.

One of the major problems involved in operating the typewriter from a reader has been in regulating the speed with which information is supplied by the reader to the maximum speed with which the typewriter is capable of handling it. This problem arises from the fact that the various functions of the typewriter require different periods of time for their operation and that it will not perform properly unless a given function is completed or almost completed before the next one is begun. For example, carriage return is a relatively slow operation whereas the typing of a character is relatively fast and thus while a carriage return operation may be begun soon after the beginning of a typing operation, a typing operation cannot be begun as quickly after the institution of a carriage return operation. Since it is desirable to supply the information to the typewriter as fast as possible without interfering with the proper operation of the machine, various schemes have been resorted to to vary the speed of the reader or the speed with which the reader supplies the information to the typewriter so that the typewriter will perform its various functions in rapid succession but not so rapidly that the functions interfere with each other.

It is an object of the present invention to provide an improved means whereby a reader which controls the operation of a typewriter is in turn controlled by the typewriter, whereby the speed with which said typewriter performs its various functions is determinative of the speed with which information is supplied to it.

Other and further objects of the invention will become apparent as the description of a preferred embodiment thereof proceeds.

Referring now to the drawings:

Figure 1 is a perspective view of a portion of an electric typewriter and showing particularly the relationship between a type action and a switch forming an element of the invention, Figure 2 is a side elevational view of the mechanism connected with the typewriter space bar, Figure 3 is a side elevational view of the back-space mechanism, Figure 4 is a perspective view of a shaft which is operated by all the typewriter function performing mechanisms and showing the switch which is operated by said shaft, Figure 5 is a side elevational view of a portion of the mechanism employed for tabulation, Figure 6 is a perspective view of a portion of the carriage return mechanism, and Figure 7 is a simplified electrical diagram.

The machine in which the invention has been embodied and which is partially shown in the drawings is the well-known "Underwood" electric typewriter but it will become apparent that it is readily adaptable to other makes of electric typewriters. Since the general arrangement of the "Underwood" machine is well known, it is only necessary to describe herein the operation of those mechanisms directly involved in this invention and those only somewhat briefly.

Referring now to Figure 1, a key 10, which may be any one of the usual letter, numeral or punctuation keys is carried by a key lever 11 pivotally mounted upon a pivot wire or rod 12 and held by a spring 13 in the position shown. A hook member 14 is pivotally carried by the key lever 11 and cooperates with an actuator 15 one end of which is pivoted to a pivotally mounted operating arm 16. An edge of the arm 16 abuts a cam portion 17 of a type bar sub-lever 18 which is pivotally mounted at 19. The sub-lever is connected by a pull-link 20 to a type bar 21 pivotally mounted upon a segment wire 22. A toothed pawl 23 is mounted for limited pivotal movement on the actuator 15 and upon operation of the key lever 11 said pawl is moved into engagement with a continuously rotating toothed shaft 24. The toothed shaft 24 drives the type against a platen 25, as will be apparent and as is well known.

The sub-lever 18, as well as the other type bar sub-levers not shown, is provided with a nose 26 underlying a universal bar 27. Arms 28, only one of which is shown, connect the bar 27 to shafts 29, only one of which is shown, rockably mounted in suitable stationary brackets, not shown. Secured to the shaft 29 is a member partially shown at 30 provided with a pin 31 adapted to cooperate with a cam portion 32 of a pivotally mounted arm 33 to swing said arm downward whenever the shaft 29 is rocked. Pivotally connected to the arm 33 at 34 is the lower end of a reciprocably mounted member 35 the upper end of which is selectively connectable with a bell crank 36 pivoted on framework of the machine at 37. The bell crank 36 is connected by a link 38 to an arm 39 of a ribbon vibrator 40 pivotally mounted on the framework at 41. The usual inked ribbon 42 is threaded between upstanding arms of the ribbon vibrator and as a type bar sub-lever 18 begins its operation to move the type bar toward the platen, the above described linkage rocks the ribbon vibrator in a clockwise direction to raise the ribbon from its normal out of sight position to a position wherein it will be struck by the type head of the type bar.

Rockably mounted between the main side frames of the machine is a shaft 43, partially shown in Figure 1 and shown in full in Figure 4. Secured to the right hand end of the shaft 43 is an arm 44 the end of which underlies the end of arm 33. A spring 45 extending between an arm 46 secured to the shaft 43 and any convenient portion of the framework normally holds the shaft 43 in the position shown in Figure 1, with the arm 44 closely adjacent the underside of arm 33. A switch operating arm 47 is secured to the shaft 43 adjacent an operating member 48 of a single-pole double-throw microswitch 49, said switch being secured to a bracket 50 fixed to a cross member 51 of the machine. As the arm 33 moves down at the beginning of any type action operation it depresses the end of arm 44 to rock the shaft 43 which in turn swings the arm 47 and operates the microswitch, for a purpose hereinafter to be explained.

In Figure 2 is shown a portion of the means for letter spacing the platen carriage without printing. The usual space bar is indicated at 52 and is mounted on the ends of a pair of space bar levers 53, only one of which actually operates the spacing mechanism and that being the only one shown. The lever 53 is pivoted at 54 and the end opposite the space bar underlies one end of a lever 55 pivotally mounted at 56. The other end of lever 55 overlies the forward end of a lever 57 similar in construction to the key lever 11 and like the lever 11 pivoted on the wire or rod 12. A hook member 58 is pivoted on the lever 57 and cooperates with an actuator 59. The actuator 59 is pivoted at its forward end to an arm 60 and articulated at its rear end by pin-and-slot connection 61 to one end of a link 62. The other end of link 62 is pivoted to the upper end of a member 63 secured to a rockshaft 64. Also secured to the rockshaft 64 is an escapement operating arm 65 adapted to cooperate with a roller 66 of a dog rocking bail 67. A pair of escapement dogs 68 are mounted on the bail 67 and cooperate with an escapement wheel 69 secured to the lower end of a shaft 70. As shown in Figure 6, the upper end of shaft 70 carries a pinion 71 which is engaged with a rack 72 forming a part of the usual paper carriage in which the platen 25 is mounted.

In operation, when the key lever 53 is rocked counterclockwise the lever 55 rocks the lever 57 counterclockwise and the hook member 58 rocks the actuator 59 about its pivotal connection with the arm 60 to engage a toothed pawl 73 carried by said actuator with the toothed shaft 24. The shaft 24 thereupon drives the actuator toward the left as viewed in the drawing causing the link 62 to rock the member 63 and the shaft 64 in a counterclockwise direction. As the shaft 64 rocks, the arm 65 operates the bail 67 allowing the escapement wheel 69 to turn the distance of one tooth space. The wheel 69 of course controls the letter-feed movement of the carriage, the carriage being constantly urged in letter-feed direction by a spring drum, not shown. The details of construction and mode of operation of the escapement mechanism are more fully disclosed in the patent to Sagner, No. 2,541,295.

The member 63 is provided at its lower end with an extension 74 which rests upon an edge of an arm 75 secured to the hereinbefore mentioned rockshaft 43 and as the member 63 rocks counterclockwise the extension 74 cooperates with the arm 75 to rock the shaft 43 counterclockwise as viewed in Figure 2. Thus, upon each spacing operation the shaft 43 operates the microswitch 49.

The microswitch 49 is also operated whenever a back-spacing operation is performed, as will now be explained. The particular back-space mechanism incorporated in the machine herein shown in part is fully disclosed in the patent to Helmond, No. 2,294,662. A key lever 76 is pivoted in the framework at 77 and articulated at its rearward end by a pin-and-slot connection 78 to a member 79 pivotally mounted upon a stationary bracket 80. A cam 81 is loosely mounted upon a bearing portion of the toothed shaft 24 and a toothed clutch element 82 is secured to said shaft. A second clutch element in the form of a pawl 83 is pivoted upon the cam 81. The clutch element 83 is spring urged to clutch engaging position but is normally held in the disengaged position shown in Figure 3 by a hooked end portion 84 of the member 79 which engages an ear 85 of said clutch element. Upon operation of the key lever 76, the hooked end 84 of member 79 releases the ear 85 and allows the clutch to engage. If the key lever is held in operated position, the ear 85 of the clutch element 83 will engage a nose 86 of the member 79 after the cam 81 has made somewhat more than half a full revolution and cause the clutch to become disengaged. Upon subsequent restoration of the key lever 76, the nose 86 releases the clutch element 83 and allows the clutch to reengage and drive the cam 81 through the remainder of its full revolution until the hooked portion 84 again engages the ear 85 and disengages the clutch.

Engaged with the periphery of cam 81 is a roller 87 mounted upon one end of a member 88 the other end of which is secured to a rockable shaft 89. A spring 90 extending between the member 88 and the framework of the machine holds the roller 87 in contact with the cam 81. An arm 91 is secured to the shaft 89 and at its upper end said arm has pivotally connected thereto a hook member 92 adapted to engage the teeth of the escapement wheel 69 and move said wheel one step in carriage returning direction each time the arm 91 is rocked in a clockwise direction. Rocking of arm 91 of course occurs when the cam 81 is rotated. As previously mentioned, this operation of the back spacing mechanism is explained in full in the patent to Helmond, No. 2,294,-662.

Rockably mounted upon a stud 93 extending inward from a side wall of the machine is a member 94 having a tab 95 engaging over the top edge of member 88 and a tab 96 lying beneath an edge of said member, as shown in Figure 3. Rocking of the member 88 thus rocks the member 94. The lower end of member 94 is provided with a tab 97 which abuts an edge of an arm 98 secured to the rockshaft 43. Thus it will be seen that when the train of mechanisms employed for back spacing is operated, the switch operating shaft 43 is rocked to operate the microswitch.

The above described mechanisms for printing, spacing and back-spacing all take approximately the same length of time for their operation but since it will presently become apparent that certain aspects of this invention require that the switch 49 be maintained in operated condition during the complete performance of all typewriting functions, the slower operations of tabulation and carriage return will now be explained.

Referring now to Figure 5, the tabulator key stem is indicated at 99, said stem resting upon a slide 100 which in turn rests upon the forward end of a pivotally mounted lever 101 similar to the type bar key levers 11. A hook member 102 operatively connects the lever 101 with an actuator 103. The actuator is provided with a toothed pawl 104 adapted to be moved into engagement with the toothed shaft 24 and is pivotally connected at its forward end to an arm 105 and connected at its rearward end by a pin-and-slot connection to one end of a link 106. The other end of link 106 is pivotally connected to the upper end of a lever 107 fixed to a rockshaft 108. Also fixed to the shaft 108 is an arm 109 which is connected by a push link 110 to a lever 111 pivoted at 112. The lower end of a slidably mounted tabulator counter stop 113 is pivoted to one end of lever 111.

Upon the institution of a tabulation operation, the toothed pawl 104 is moved into engagement with the toothed shaft 24 and said shaft drives the actuator 103 toward the left as viewed in the drawing, thus causing the link 106 to rock the lever 107 and the shaft 108 in a counterclockwise direction. Rocking of shaft 108 causes the push link 110 to rock the lever 111 in a counterclockwise direction to thereby raise the counterstop 113 to a position wherein its upper end is in the path of movement of a settable tabulator stop 114 carried by a rack 115 forming a portion of the typewriter carriage. The counterstop 113 is latched in its raised position and held there until struck by a stop 114. An escapement release lever 116 is pivotally mounted at 117 and connected by a pin-and-slot connection 118 to one arm of lever 111 and as the lever 11 is rocked, the lower end of lever 116 moves the escapement holding dog 68 out of engagement with the wheel 69, thus permitting free movement of the carriage to its position wherein the stop 114 contacts the counterstop 113. The above described mechanism for tabulating the carriage is fully disclosed in the patent to Helmond, No. 2,303,878.

At its lower end the lever 107 is connected to the upper end of a link 119 the lower end of which is pivotally connected to an arm 120 secured to the switch operating shaft 43. The connection between the lever 107 and link 119 is in the form of a bolt 121 which passes through an elongated opening in the link so that said link may move when the shaft 43 is rocked by one of the other mechanisms without affecting the tabulation mechanism. At the beginning of a tabulation operation the lever 107 pulls up on the link 119 to thereby rock the shaft 43 and operate the switch 49 as aforesaid. No matter how long the tabulation movement of the carriage lasts, the shaft 43 is held in its rocked condition during carriage movement due to the fact that the counterstop 113 is latched up and, through the lever 111, link 110 and arm 109, holds the shaft 108 and lever 107 in rocked condition.

The most frequently encountered relatively slow operation is the carriage return operation and the mechanism for performing this function is partially shown in Figure 6. The mechanism is shown and described in full in the patent to Sagner, No. 2,541,295 and need be only briefly referred to herein. The carriage return key 122 is connected to the forward end of a lever 123 pivoted at 124 on one of the side plates of the machine. At its rearward end the lever 123 is provided with a pin 125 which underlies one arm of a pivotally mounted latch member 126. Another arm of the latch member 126 hooks over an end of a clutch control lever 127. The control lever 127 is pivotally mounted at 128 in a housing 129 located rearwardly of the paper carriage. A clutch operating arm 130 is secured to the end of a carriage return clutch operating shaft which extends into a transmission housing 131 and said arm is urged toward clutch engaging position by a spring 132. A link 133 extends between the control lever 127 and the arm 130. As long as the control lever 127 is held in the position shown, the spring 132 cannot move the arm 130 and the carriage return clutch remains open. Upon operation of the lever 123, the latch member 126 is disengaged from the lever 127 and the spring 132 thereupon swings the arm 130 to engage the carriage return clutch and at the same time swings the lever 127 in a counterclockwise direction about its pivot 128. Engagement of the carriage return clutch causes the electric motor 134 to drive a pulley 135 to wind up a band 136 which is connected to said pulley at one end and connected to the paper carriage at the other. This of course moves the carriage to position for beginning a new line of writing and this operation takes an appreciably greater time than, for example, the typing of a character.

The upper end of clutch control lever 127 is pivotally connected to a slide 137 having a pin 138 which rests against the side of a margin countersop 139 the upper end of which extends into the path of movement of a margin stop 140 adjustable longitudinally of the carriage to vary the line-start position. As the lever 127 swings counterclockwise, it moves the slide 137 toward the left and the pin 138 moves the upper end of the margin counterstop to the left. The parts remain in that position until the margin stop 140 strikes the counterstop and restores said parts to the position shown in the drawing.

Swingably mounted upon a bracket 141 secured to the cross member 51 is a two-armed lever 142. One arm of said lever overlies the clutch control lever 127 and the other arm thereof is provided with a tab 143 which engages an edge of an arm 144 secured to the switch operating shaft 43. Thus, movement of the clutch control lever 127 to carriage return clutch engaging position is effective to rock the lever 142 and the shaft 43 and serves to hold said shaft operated until the carriage return operation is completed.

As mentioned in the introductory portion of the specification, the present invention provides a typewriting machine which can be operated under the control of means other than a human operator. To facilitate this, power devices in the form of solenoids 145 are connected to each of the keys of the keyboard or to a part of the train of operating mechanisms closely adjacent the key levers. There are numerous known means for selectively energizing the solenoids and, for purposes of illustration only, a back-acting rotary stepping switch 146 is diagrammatically shown in Figure 7. As is known, the stepping switch has a stepping coil or solenoid which when energized tensions a spring driven member so that upon deenergization said member steps the contact arm 147 to the next stationary contact 148.

It was previously mentioned that the microswitch 49 is of the single pole double throw type and, as shown in Figure 7, said switch is normally conditioned to close a circuit from a source of direct current, such as a battery 149, through the stepping switch 146 and solenoids 145. Under these conditions it will be apparent that whichever one of the solenoids 145 has its stationary contact 148 engaged by the contact arm 147 will be energized to thereby institute operation of the train of mechanism associated with that particular solenoid.

It has been previously explained how each of the trains of mechanisms for performing the various functions of the machine operates the switch 49 and holds it operated until the function is completed. Operation of the switch 49 opens the circuit through the stepping switch 146 and solenoids 145 and closes a circuit through the stepping coil. Since the stepping switch is of the back-acting type, a slow releasing relay SR, energized by the circuit through the stepping switch, is included in the circuit through the stepping coil so that shortly after the switch 49 closes the circuit through the stepping coil, the relay SR opens, thereby deenergizing the stepping coil and permitting the spring in the stepping switch to move the contact arm 147 to the next contact 148. Now even though the stepping switch 146 has selected the solenoid 145 to be energized next, said solenoid will not be energized until the previously instituted typing function has been completed because the switch 49 does not until then reestablish the circuit through the stepping switch.

The sequence of operation is that a circuit is established through the switch 49, the stepping switch 146 and one of the solenoids 145 to thereby institute the desired typing operation such as printing, back-spacing, carriage return, etc. As soon as the selected function is begun, the switch 49 is operated to break the circuit through the solenoids 145 and the stepping switch and establish a circuit through the stepping coil. The stepping switch is then operated to select another solenoid 145 controlling another function of the typewriter. Not until the first function is completed, whether it takes a short time or a long time, is the switch 49 restored to normal condition to establish the circuit through the next selected solenoid.

While the control for the solenoids 145 has been illustrated as a stepping switch, it will be apparent that there are other well-known devices which may be employed. The stepping switch is in effect a "reader" which supplies information to the solenoids and it may take the form of a device for sensing a punched tape or for reading a magnetized tape or drum and the stepping coil may be the device which drives the tape or rotates the drum. The particular reader and means for supplying information to the reader are not of the essence of this invention. The important thing here is that the time required for performing the various typewriting functions is determinative of the speed with which the reader supplies additional information to the typewriter so that each function may follow the previous function as rapidly as possible without conflicting with it.

Having described a preferred embodiment of the invention, what is claimed is:

1. In a typewriting machine having a plurality of type actions and an automatic control apparatus for said type actions which is stepwise feedable to cause successive type-action operations in accord with a predetermined program; solenoids individually associated with said type actions and energizable to cause operations of the latter, a switch universal to said solenoids and controlled by the type actions during their operations first to open and then to close, means under control of said type actions to step-feed said apparatus during each operation of any type action while said universal switch is open, an electric power source, and solenoid selecting contacts in series with said solenoids, said power source and the said universal switch, and controlled by said apparatus through the step-feeds imparted thereto to cause in accord with said program successive new type-action operations timed by the closures of said universal switch.

2. In a typewriting machine having a plurality of type actions and an automatic control apparatus for said type actions which is stepwise feedable to cause successive type-action operations in accord with a predetermined program; solenoids individually associated with said type actions and energizable to cause operations of the latter, a switch universal to said solenoids, a rockable means being universal to said type actions and controlled thereby during their operations first to open said switch and then to close it, means under control of said type actions to step-feed said apparatus during each operation of any type action while said universal switch is open, an electric power source, and solenoid selecting contacts in series with said solenoids, said power source and the said universal switch, said contacts controlled by said apparatus through the step-feeds imparted to the latter to cause in accord with said program successive new type-action operations timed by closures of said switch.

3. In a typewriting machine having a plurality of type actions and an automatic control apparatus for said type actions stepwise feedable to cause successive operations of said type actions in accord with a predetermined program; solenoids individually associated with said type actions and energizable to cause operations of the latter, a switch universal to said solenoids, a rockable member universal to said type actions and controlled thereby during their operations first to open said switch and then to close it, means including a relay universally controlled by said type actions to cause a step-feeding operation of said apparatus during each operation by any type action while said universal switch is open, an electric power source, and selecting contacts for said solenoids in series with the said solenoids, the said power source and the said universal switch, said contacts controlled by said apparatus through the step-feeds imparted to the latter to cause responsive to closure of said switch following each said step-feed an individual operation of a solenoid in accord with said program.

4. In a typewriting machine having an apparatus stepwise movable to call typing functions into operation in accord with a predetermined program; a continuously driven power means, type actions individually connectable to said power means to cause them to execute power operations and restorations, solenoids individual to said type actions for connecting them individually to the power means, circuit closing means individual to said solenoids and selectively controlled by said apparatus through stepwise movement thereof, a master switch in series with all said circuit closing means, each solenoid requiring for its energization the closure of its circuit closing means and also the closure of the master switch, means to open and close said master switch respectively by the beginnings and endings of the operations of said type actions, and means controlled by the power operated type actions to effect in accompaniment with each operation thereof a step movement of said apparatus after the master switch opens and before it closes.

5. In a typewriting machine having an apparatus stepwise movable to call typing functions into operation in accord with a predetermined program; a continuously driven power means, type actions individually connectable to said power means to cause them to execute power operations and restorations, solenoids individual to said type actions for connecting them individually to the power means, circuit closing means individual to said solenoids and selectively controlled by said apparatus through stepwise movement thereof, a master switch in series with all said circuit closing means, each solenoid requiring for its energization the closure of its circuit closing means and also the closure of the master switch, a rockable universal bar common to said type actions and controlled thereby to open and close said master switch respectively by the beginnings and endings of their operations, and means controlled by the power operated type actions to effect in accompaniment with each operation thereof a step movement of said apparatus after the master switch opens.

6. In a typewriting machine having an apparatus stepwise movable to call typing and other functions into operation in accord with a predetermined program; a continuously driven power means, type actions individually connectable to said power means to cause them to execute an operation and a restoration, various devices to carry out functions other than typing and requiring different durations of operations to carry out such functions, said devices each including a means operable to institute operations thereof and being restorable automatically as the function of the operated device is concluded, solenoids individual to said type actions for connecting them individually to the power means, solenoids individual to said operation instituting means to operate them and thereby call said devices into operation, circuit closing means individual to the various solenoids and controlled by said apparatus through stepwise movement thereof, switch means in series collectively with said circuit closing means, each solenoid requiring for its energization the closure of its circuit closing means and additionally the closure of the switch means, means to open and close said switch means respectively by the beginnings and endings of the operations of said type actions, and respectively also by the operations and the restorations of any of said operation instituting means, and means controlled by the type actions and the operation instituting means to effect in accompaniment with all operations thereof a step movement of said apparatus after the said switch means opens and before it closes again.

7. In a typewriting machine having an apparatus stepwise movable to call certain devices into operation to carry out various functions in accord with a predetermined program, said devices requiring different durations of operations to carry out their functions; means individual to said devices, operable to institute their operation and becoming automatically restored as the function of the operated device is completed, solenoids individual to said instituting means to operate them, circuit closing means individual to said solenoids and controlled by said apparatus through stepwise movement thereof, switch means in series collectively with said circuit closing means, each solenoid requiring for its energization the closure of its own circuit closing means and additionally the closure of the switch means, means to open and to close said switch means respectively by the operations and the restorations of any of said instituting means, and means controlled by the operation instituting means to effect in accompaniment with all operations thereof a step movement of said apparatus after the said switch means opens and before it closes again.

8. In a typewriting machine having an apparatus stepwise feedable to cause operations of different devices individualy in accord with a predetermined program; a continuously driven power means, a relay for step-feeding said apparatus, solenoids individually associated with said devices to conect them to said power means for operation, said devices being self restoring after operation, solenoid selecting contacts controlled in accord with said program through step-feeding said apparatus, a switch capable of movement between two positions and in one position completing the circuit of the contact-solenoid and in the other position closing the circuit for said relay, a rockable universal means controlled by said devices and operatively associated with said switch so that said restorations and operations of said devices will respectively move said switch to said one and said other position, and means to disrupt automatically the relay circuit after each closure, whereby immediately responsive to the restoration of any device, the device next to be operated becomes connected to the power member.

References Cited in the file of this patent

FOREIGN PATENTS 399,586    Great Britain _____ Oct. 12, 1933

UNITED STATES PATENT OFFICE
CERTIFICATE OF CORRECTION

Patent No. 2,848,090                                      August 19, 1958

Arthur H. Sharpe et al.

It is hereby certified that error appears in the printed specification of the above numbered patent requiring correction and that the said Letters Patent should read as corrected below.

Column 7, line 51, for "operation by" read -- operation of --.

Signed and sealed this 18th day of November 1958.

(SEAL)
Attest:

KARL H. AXLINE                                                ROBERT C. WATSON
Attesting Officer                                           Commissioner of Patents